United States Patent
Takahashi

(10) Patent No.: US 9,864,137 B2
(45) Date of Patent: Jan. 9, 2018

(54) OPTICAL WAVEGUIDE ELEMENT, OPTICAL WAVEGUIDE DEVICE, AND METHOD FOR ARRANGING OPTICAL WAVEGUIDE

(71) Applicant: NEC Corporation, Tokyo (JP)

(72) Inventor: Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/919,253

(22) Filed: Oct. 21, 2015

(65) Prior Publication Data

US 2016/0116676 A1   Apr. 28, 2016

(30) Foreign Application Priority Data

Oct. 22, 2014 (JP) .................................. 2014-215057

(51) Int. Cl.
| | | |
|---|---|---|
| G02B 6/28 | (2006.01) | |
| G02B 6/27 | (2006.01) | |
| G02B 6/126 | (2006.01) | |
| G02B 6/122 | (2006.01) | |
| G02B 6/12 | (2006.01) | |

(52) U.S. Cl.
CPC ............ G02B 6/126 (2013.01); G02B 6/1223 (2013.01); G02B 2006/12119 (2013.01)

(58) Field of Classification Search
CPC ... G02B 5/3083; G02B 6/2808; G02B 6/2706
USPC .............................. 359/489.07; 385/122–132
See application file for complete search history.

(56) References Cited

U.S. PATENT DOCUMENTS

| | | | | |
|---|---|---|---|---|
| 5,341,444 A | * | 8/1994 | Henry ................ | G02B 6/12004 385/11 |
| 5,732,177 A | * | 3/1998 | Deacon .................. | G02F 1/011 385/122 |
| 6,078,704 A | * | 6/2000 | Bischel ................... | G02F 1/011 385/10 |
| 6,374,013 B1 | * | 4/2002 | Whiteaway ........ | G02B 6/12011 385/140 |
| 7,092,598 B2 | * | 8/2006 | Evans ...................... | H01S 5/42 372/43.01 |
| 7,916,985 B2 | * | 3/2011 | Peale ................. | G01B 9/02072 385/16 |
| 8,213,752 B2 | * | 7/2012 | Chapman ............... | G02B 6/125 385/17 |
| 2003/0128905 A1 | * | 7/2003 | Kambe ................... | G02F 1/225 385/3 |
| 2005/0286832 A1 | * | 12/2005 | Witzens ................. | G02B 6/124 385/37 |
| 2007/0147724 A1 | * | 6/2007 | Ishizaka ............... | G02F 1/0147 385/8 |

FOREIGN PATENT DOCUMENTS

| | | |
|---|---|---|
| WO | WO 2011/115285 | 9/2011 |
| WO | WO 2014/125535 A1 | 8/2014 |

* cited by examiner

*Primary Examiner* — Frank Font
(74) *Attorney, Agent, or Firm* — Finnegan, Henderson, Farabow, Garrett & Dunner, L.L.P.

(57) ABSTRACT

An optical waveguide element according to an exemplary aspect of the invention includes a first optical waveguide configured by combining a plurality of first element waveguides; and a second optical waveguide configured by combining a plurality of second element waveguides each of which having the same structure as the plurality of first element waveguides.

19 Claims, 4 Drawing Sheets

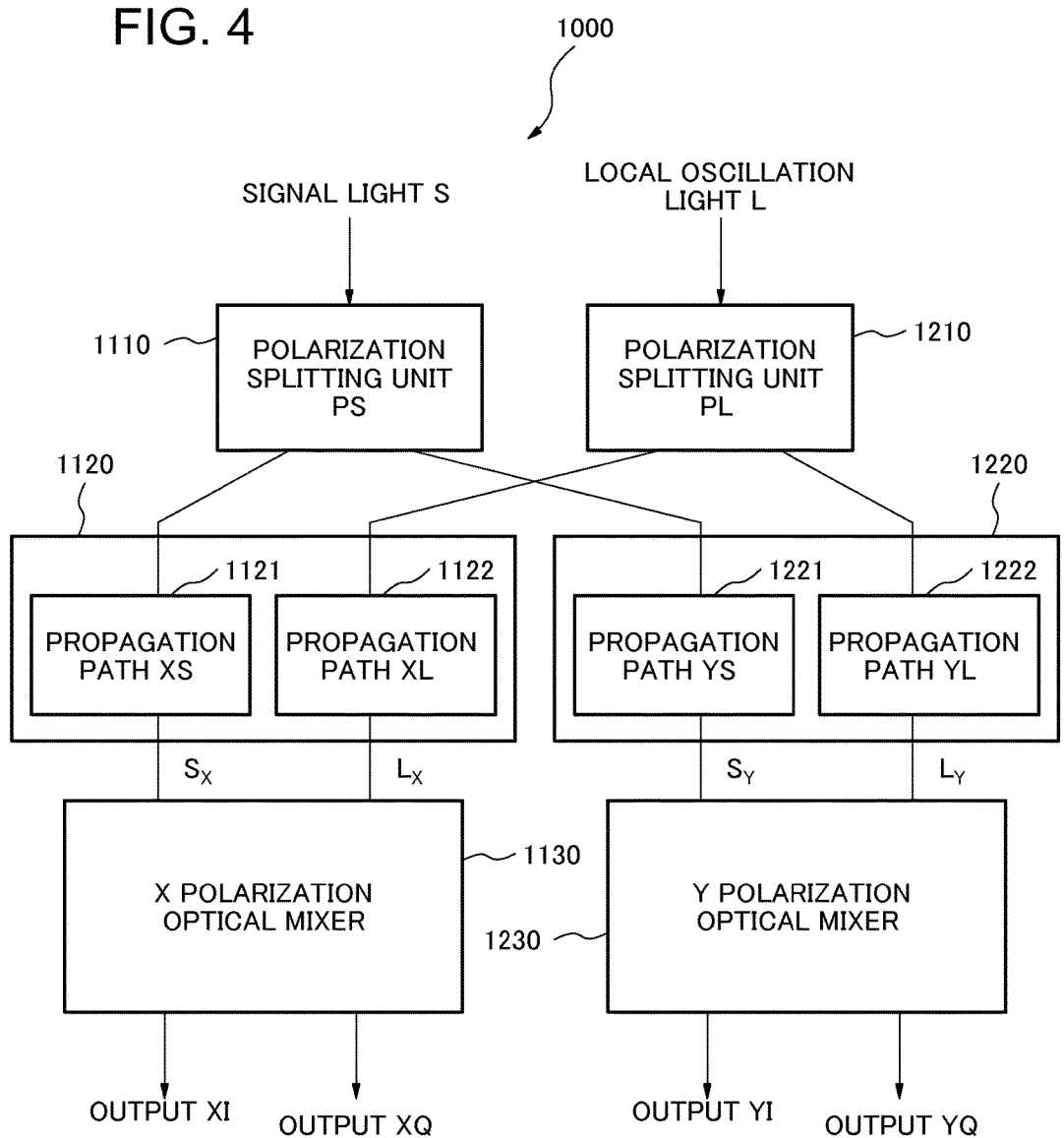

OPTICAL WAVEGUIDE ELEMENT, OPTICAL WAVEGUIDE DEVICE, AND METHOD FOR ARRANGING OPTICAL WAVEGUIDE

This application is based upon and claims the benefit of priority from Japanese Patent Application No. 2014-215057, filed on Oct. 22, 2014, the disclosure of which is incorporated herein in its entirety by reference.

TECHNICAL FIELD

The present invention relates to optical waveguide elements, optical waveguide devices, and methods for arranging optical waveguides and, in particular, to an optical waveguide element, an optical waveguide device, and a method for arranging an optical waveguide, including a plurality of optical waveguides.

BACKGROUND ART

An optical fiber communication technology has made substantial progress in increasing the capacity and the distance by means of high-speed intensity modulation techniques and wavelength multiplexing techniques. In addition to this, the improvement of digital signal processing technologies has enabled to utilize polarization multiplexing technologies and multi-level phase modulation technologies in recent years. This makes it possible to dramatically increase the transmission capacity using existing optical fiber networks.

The multi-level phase modulation technology requires in a receiver an element called an optical hybrid mixer to convert phase modulation optical signals into intensity modulation optical signals. The optical hybrid mixer converts a phase variation of the phase-modulated signal light into the intensity modulation optical signal by making signal light having propagated through an optical fiber interfere with local oscillation light (local light) having a constant amplitude and phase without modulation. Such optical hybrid mixer requires an optical waveguide with excellent optical characteristics.

On the other hand, the downsizing and cost reduction of the optical hybrid mixer have strongly been required to transmit a larger amount of signals over a longer distance at a lower cost. Since a silicon optical waveguide strongly confines the light within an optical waveguide, it makes possible to dramatically reduce the size compared with a glass-based optical waveguide that has been mainly used in the past. Many technologies have been developed to realize the silicon optical waveguide utilizing CMOS (complementary metal oxide semiconductor) process technologies used for manufacturing LSI (large scale integration) circuits (see WO 2014-125535, for example).

Because the silicon optical waveguide is made of silicon material whose refractive index is large, a propagation mode size is very small compared with that of a glass waveguide made mainly of silica glass. This makes the propagation mode vary sensitively according to the variation of a core shape. Accordingly, extreme processing accuracy is required in comparison with that in a case in which the optical waveguide is formed by glass processing technologies. For example, the core width of the glass waveguide is controlled with plus or minus 0.1 micrometers (μm) accuracy, but the core width of the silicon waveguide needs controlling with plus or minus several nanometers (nm) accuracy. It is expected to apply the CMOS process technology, which can realize such high processing accuracy, to the optical waveguide technology.

In an electronic device, it is required to control the width of a local pattern such as a gate electrode of a MOS transistor or the like. In contrast, in the optical waveguide, in order to control a phase stably, it is necessary to stably control a continuous pattern in length from several tens of micrometers (nm) to several hundred micrometers (μm), or in millimeter order length in some cases. Some sort of trouble can occur that does not affect the electronic device. Thus, there is a technical problem that needs to be solved to realize the silicon optical waveguide with intended characteristics by using the CMOS process technology.

On the other hand, aside from the above-mentioned processing technology, an example of technologies is described in WO 2011-115285 by which the difference in optical path length of the optical waveguide is correctly controlled. The optical waveguide described in WO 2011-115285 is a pair of optical waveguides having a curved section, and this curved section is composed of at least an arc-like waveguide section having the same curvature. The pair of optical waveguides is configured in which the number of the arc-like waveguide sections included in each optical waveguide is equal to each other. It is said that such configuration enables the difference in optical path length of a pair of optical waveguides to be correctly controlled in a pair of optical waveguides each of which is composed of a combination of a lot of curved waveguide sections.

SUMMARY

An exemplary object of the invention is to provide an optical waveguide element, an optical waveguide device, and a method for arranging an optical waveguide which solve the problem that the coherence of the light propagating through each optical waveguide decreases if an optical waveguide element including a plurality of optical waveguides is miniaturized and highly integrated.

An optical waveguide element according to an exemplary aspect of the invention includes a first optical waveguide configured by combining a plurality of first element waveguides; and a second optical waveguide configured by combining a plurality of second element waveguides each of which having the same structure as the plurality of first element waveguides.

A method for arranging an optical waveguide according to an exemplary aspect of the invention includes preparing a plurality of element waveguide structures representing structures of a plurality of element waveguides composing an optical waveguide; determining an arrangement of a first optical waveguide by combining the plurality of element waveguide structures; and determining an arrangement of a second optical waveguide by combining the plurality of element waveguide structures.

BRIEF DESCRIPTION OF THE DRAWINGS

Exemplary features and advantages of the present invention will become apparent from the following detailed description when taken with the accompanying drawings in which:

FIG. 4 is a block diagram illustrating a configuration of an optical waveguide device in accordance with a second exemplary embodiment of the present invention.

EXEMPLARY EMBODIMENT

An exemplary embodiment of the present invention will be described below with reference to the drawings.

A First Exemplary Embodiment

Figure 1:
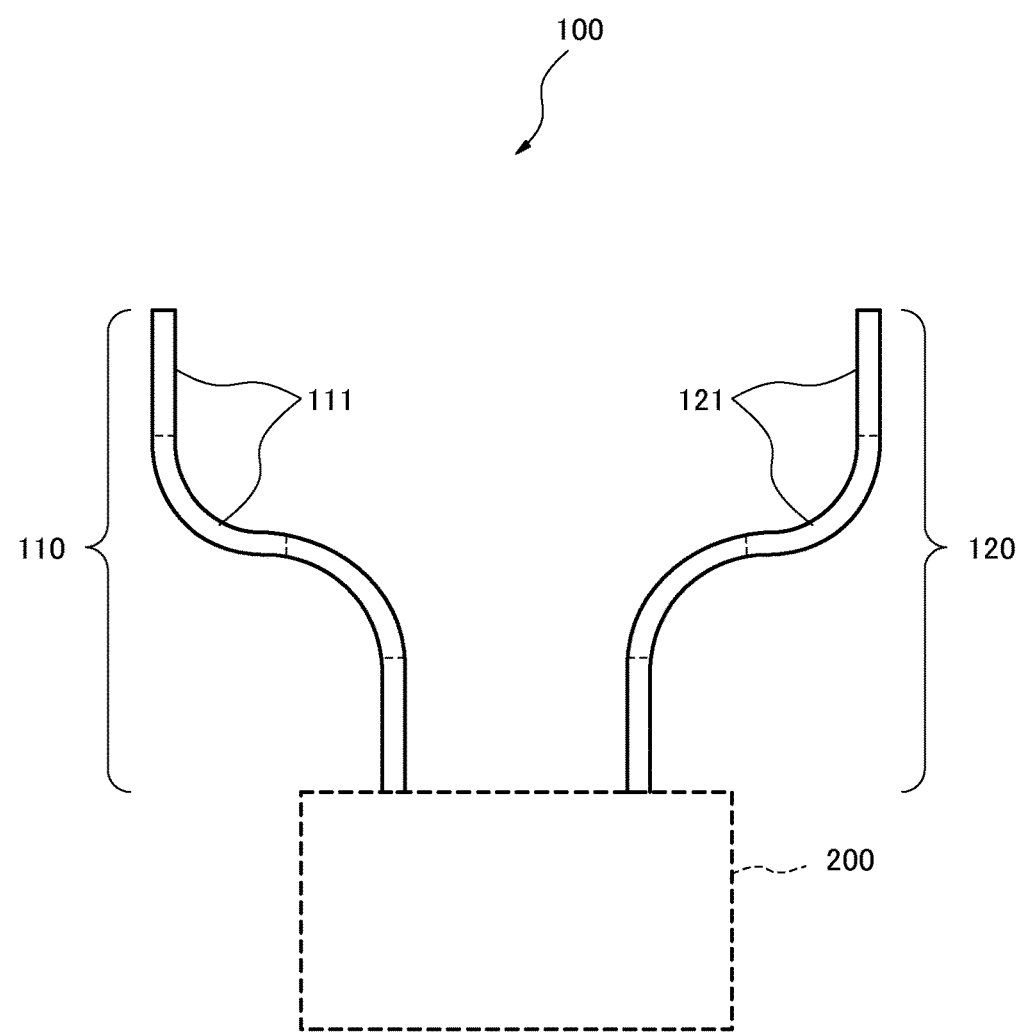
FIG. 1 is a block diagram schematically illustrating a configuration of an optical waveguide element in accordance with a first exemplary embodiment of the present invention.

FIG. 1 is a block diagram schematically illustrating a configuration of an optical waveguide element 100 in accordance with a first exemplary embodiment of the present invention.

The optical waveguide element 100 according to the present exemplary embodiment includes a first optical waveguide 110 and a second optical waveguide 120. The first optical waveguide 110 is configured by combining a plurality of first element waveguides 111. The second optical waveguide 120 is configured by combining a plurality of second element waveguides 121 each of which has the same structure as each of the plurality of first element waveguides 111 has. That is to say, the first optical waveguide 110 and the second optical waveguide 120 are configured by combining the plurality of element waveguides 111 and 121 that have the same structure, and therefore they have the same variation of the polarization state of the traveling light.

Each of the first element waveguide 111 and the second element waveguide 121 is either a linear waveguide or a curved waveguide. In an example shown in FIG. 1, the first optical waveguide 110 and the second optical waveguide 120 have the same structure including two linear waveguides and an S-shaped waveguide composed of two 90-degree curved waveguides.

Such structure makes equal the variation of the polarization state that the light propagating through each of the first optical waveguide 110 and the second optical waveguide 120 is subjected to during propagation. Therefore, even if the polarization is not maintained during propagating through the first optical waveguide 110 and the second optical waveguide 120, the polarization states of the light after having propagated become equal to each other. As a result, it is possible to maintain the coherence of the light propagating through each of the optical waveguides 110 and 120.

Thus, according to the optical waveguide element 100 of the present exemplary embodiment, the coherence of the propagating light can be maintained. This enables to obtain good interference characteristics by inputting two kinds of light having propagated through the optical waveguide element 100 into an optical mixing unit 200 such as an optical hybrid mixer. As a result, the normal operation of the optical hybrid mixer and the like can be realized. That is to say, each of the first optical waveguide 110 and the second optical waveguide 120 can be used as the optical waveguide connecting the optical mixing unit 200 to a polarization splitting unit splitting an incident light beam into mutually orthogonal polarization light beams. The optical mixing unit 200 mixes the first propagation light having propagated through the first optical waveguide 110 and the second propagation light having propagated through the second optical waveguide 120.

The first optical waveguide 110 and the second optical waveguide 120 can be configured to consist primarily of silicon materials. Even in this case, since the polarization states of the light after having propagated through each optical waveguide become equal to each other, it is possible to maintain the coherence of the propagating light even if the silicon optical waveguide is used in order to be miniaturized.

The combination way of the plurality of first element waveguides 111 can differ from that of the plurality of second element waveguides 121. This can increase a degree of freedom of arrangement of the first optical waveguide 110 and the second optical waveguide 120. Even in this case, since the polarization states of the light after having propagated become equal to each other, it is possible to maintain the coherence of the propagating light even if an optical circuit configuration is complicated by high integration.

Next, a method for arranging an optical waveguide according to the present exemplary embodiment will be described.

In the method for arranging the optical waveguide according to the present exemplary embodiment, first, a plurality of element waveguide structures are prepared that represent structures of a plurality of element waveguides composing an optical waveguide. The arrangement of a first optical waveguide is determined by combining the plurality of element waveguide structures, and the arrangement of a second optical waveguide is determined by combining the plurality of element waveguide structures.

As mentioned above, according to the optical waveguide element 100 and the method for arranging an optical waveguide of the present exemplary embodiment, the coherence of the light propagating through each optical waveguide can be maintained even though an optical waveguide element including a plurality of optical waveguides is miniaturized and highly integrated.

FIG. 1 illustrates the first optical waveguide 110 and the second optical waveguide 120 that have a symmetrical configuration. However, it is sometimes difficult to have a symmetrical or the same configuration if various optical circuits are integrated.

Figure 2:
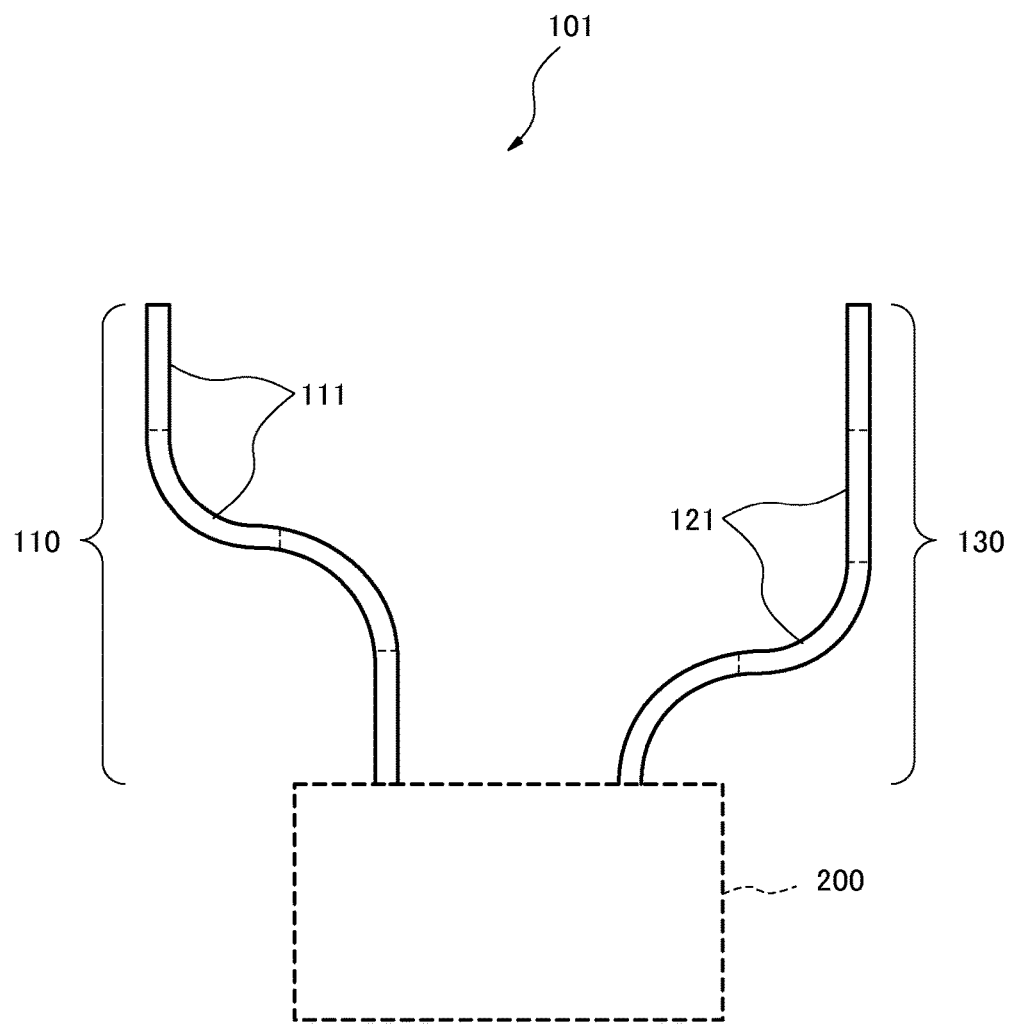
FIG. 2 is a block diagram schematically illustrating another configuration of an optical waveguide element in accordance with a first exemplary embodiment of the present invention.

In such case, the optical waveguide element according to the present exemplary embodiment can be configured as shown in FIG. 2, for example. With regard to an optical waveguide element 101 of the present exemplary embodiment shown in FIG. 2, the configuration of the first optical waveguide 110 is the same as that shown in FIG. 1. On the other hand, as for a second optical waveguide 130, the combination way of the plurality of second element waveguides 121 differs from the combination way of the plurality of first element waveguides 111. That is to say, the plurality of first element waveguides 111 and the plurality of second element waveguides 121 are configured to include a plurality of linear waveguides having different lengths.

However, the linear waveguides included in the plurality of second element waveguides 121 have a configuration in which two linear waveguides in the first element waveguides 111 are connected. Accordingly, both the first optical waveguide 110 and the second optical waveguide 130 have the same structure that is configured to include two linear waveguides and two 90-degree curved waveguides. In such case, since the same variation of the polarization state occurs in the first optical waveguide 110 and the second optical waveguide 130, the polarization states of the light after having propagated become equal to each other.

Figure 3:
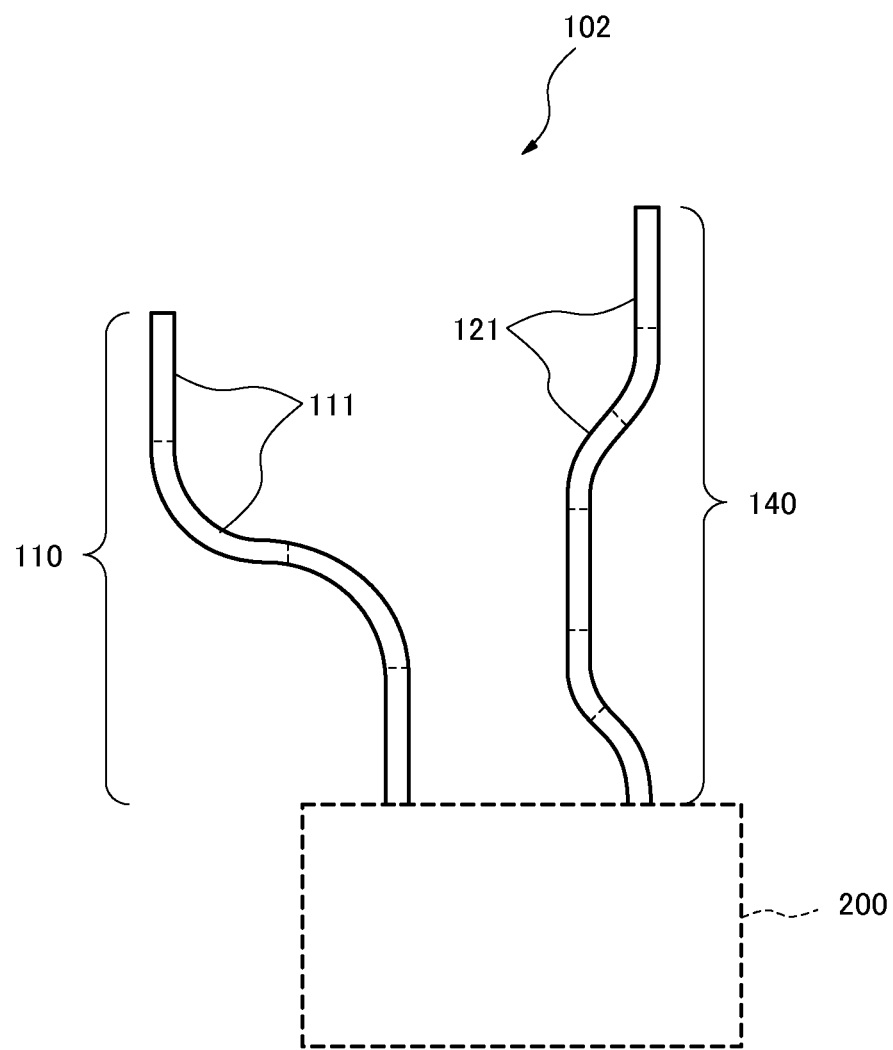
FIG. 3 is a block diagram schematically illustrating still another configuration of an optical waveguide element in accordance with a first exemplary embodiment of the present invention.

As shown in FIG. 3, a configuration can be used in which a second optical waveguide 140 includes a 45-degree curved waveguide as the second element waveguide 121 and an S-shaped waveguide is formed by using two 45-degree curved waveguides. The 90-degree curved waveguide, which is included in the first element waveguides 111 composing the first optical waveguide 110, includes two 45-degree curved waveguides. Accordingly, both the first optical waveguide 110 and the second optical waveguide 140 have the same structure that is configured to include two linear waveguides and four 45-degree curved waveguides. In such case, since the same variation of the polarization state occurs in the first optical waveguide 110 and the second optical waveguide 140, the polarization states of the light after having propagated become equal to each other.

A Second Exemplary Embodiment

Next, a second exemplary embodiment of the present invention will be described. In the present exemplary embodiment, an optical waveguide device will be described that uses the optical waveguide element according to the first exemplary embodiment.

The optical waveguide device according to the present exemplary embodiment includes an optical waveguide element and an optical mixing unit that mixes first propagation light having propagated through a first optical waveguide composing the optical waveguide element and second propagation light having propagated through a second optical waveguide composing the optical waveguide element. The optical waveguide device can be configured to include a polarization splitting unit splitting an incident light beam into mutually orthogonal polarization light beams at the end opposite to an end, to which the optical mixing unit is connected, of the first optical waveguide and the second optical waveguide.

Next, the optical waveguide device according to the present exemplary embodiment will be described in more detail.

FIG. 4 is a block diagram illustrating a configuration of an optical waveguide device 1000 in accordance with the present exemplary embodiment.

The optical waveguide device 1000 according to the present exemplary embodiment includes a polarization splitting unit 1110 for signal light S, a polarization splitting unit 1210 for local oscillation light L, a first optical waveguide element 1120, a second optical waveguide element 1220, an X polarization optical mixer 1130 and a Y polarization optical mixer 1230, as the optical mixing unit.

The polarization splitting unit 1110 and the polarization splitting unit 1210 split the signal light S and the local oscillation light L into an X polarization component and a Y polarization component that are orthogonal to each other, respectively.

A first optical waveguide 1121 included in the first optical waveguide element 1120 configures a propagation path XS for the signal light $S_X$ with X polarization, and a second optical waveguide 1122 included in the first optical waveguide element 1120 configures a propagation path XL for the local oscillation light $L_X$ with X polarization. Similarly, a first optical waveguide 1221 included in the second optical waveguide element 1220 configures a propagation path YS for the signal light $S_Y$ with Y polarization, and a second optical waveguide 1222 included in the second optical waveguide element 1220 configures a propagation path YL for the local oscillation light $L_Y$ with Y polarization.

The signal light $S_X$ with X polarization having propagated through the propagation path XS and the local oscillation light $L_X$ with X polarization having propagated through the propagation path XL are inputted into the X polarization optical mixer 1130. The signal light $S_Y$ with Y polarization having propagated through the propagation path YS and the local oscillation light $L_Y$ with Y polarization having propagated through the propagation path YL are inputted into the Y polarization optical mixer 1230.

In the optical waveguide device 1000 according to the present exemplary embodiment, the propagation paths of the signal light and the local oscillation light (XS, XL, YS, and YL), each of which leads to the X polarization optical mixer 1130 or the Y polarization optical mixer 1230, are composed of a combination of a plurality of element waveguides having the same structure. Therefore, the coherence between the signal light and the local oscillation light is maximized even if the signal light and the local oscillation light inputted into the X polarization optical mixer 1130 and the Y polarization optical mixer 1230 do not maintain the linear polarization state just after being split by the polarization splitting units (PS and PL). As a result, the X polarization optical mixer 1130 and the Y polarization optical mixer 1230 can decode the signal normally.

Next, the operation of the optical waveguide device 1000 according to the present exemplary embodiment will be described. For ease of explanation, the operation of the X polarization side will be described below.

The signal light S and the local oscillation light L of two kinds of input signals are split into the X polarized light and the Y polarized light that are orthogonal to each other by the polarization splitting unit (PS) 1110 and the polarization splitting unit (PL) 1210, respectively. The signal light $S_X$ with X polarization and the local oscillation light $L_X$ with X polarization are inputted into the X polarization optical mixer 1130 through the propagation path XS and the propagation path XL, respectively.

In order to make the signal light $S_X$ interfere with the local oscillation light $L_X$ in the X polarization optical mixer 1130, it is desirable for the orthogonal polarization state split in the polarization splitting units (PS, PL) to be maintained. In such case, since the signal light $S_X$ and the local oscillation light $L_X$ have the same polarization state, the coherence is maximized. The signal light $S_X$ and the local oscillation light LX are usually polarized linearly.

It will be considered that the signal light $S_X$ and the local oscillation light $L_X$ become different polarization states such as different elliptical polarization states because the variation of the polarization state occurs in at least one of the propagation path XS and the propagation path XL. This case becomes equal to a situation in which each of the signal light $S_X$ and the local oscillation light $L_X$ includes two kinds of signal components different in phase, that is, two kinds of orthogonal polarization components. Therefore, output signals (XI and XQ) are not orthogonal to each other which are obtained by making the signal light $S_X$ interfere with the local oscillation light $L_X$. This becomes more conspicuous as the difference in the polarization states between the signal light $S_X$ and the local oscillation light $L_X$ is lager, and it becomes difficult to decode the signal normally.

However, in the optical waveguide device 1000 according to the present exemplary embodiment, the propagation path XS for the signal light $S_X$ and the propagation path XL for the local oscillation light $L_X$ are configured by combining the plurality of element waveguides that have the same structure, as mentioned above. Specifically, for example, both the propagation path XS and the propagation path XL can be configured to include two linear waveguides one millimeter long and two 90-degree curved waveguides with a curvature radius of 0.5 millimeters. In this case, each one can be also configured to include four linear waveguides 0.5 millimeter long and four 45-degree curved waveguides with a curvature radius of 0.5 millimeters by further dividing each waveguide into a plurality of the element waveguides.

Thus, it can make equal the variation of the polarization state that the propagation path XS and the propagation path XL are configured by combining the plurality of element waveguides which have the same structure. Therefore, the polarization states of the signal light $S_X$ and the local oscillation light $L_X$ inputted into the X polarization optical mixer 1130 become equal to each other. However, the signal light $S_X$ and the local oscillation light $L_X$ do not necessarily have to be polarized linearly. It is possible to decode the signal normally because the coherence is maximized in the X polarization optical mixer 1130 as long as the polarization states of the signal light $S_X$ and the local oscillation light $L_X$ are equal to each other.

The operation in the X polarization side of the optical waveguide device 1000 mentioned above applies to that in the Y polarization optical mixer 1230 at the Y polarization side. That is to say, it can make equal the polarization states of the signal light $S_Y$ and the local oscillation light $L_Y$ inputted into the Y polarization optical mixer 1230 that the propagation path YS and the propagation path YL are configured by combining the plurality of element waveguides which have the same structure. As a result, it becomes possible to decode the signal normally also in the Y polarization optical mixer 1230.

As mentioned above, according to the optical waveguide device 1000 of the present exemplary embodiment, it is possible to make equal the variations in the polarization states of the light having propagated through the optical waveguide element including a plurality of optical waveguides. Therefore, it is possible to maintain the coherence of the light propagating through each optical waveguide even though the optical waveguide device is configured to be miniaturized by using silicon optical waveguides, or the optical circuit becomes more complex due to being highly integrated.

As mentioned above, the optical hybrid mixer is an optical waveguide element that makes the inputted signal light interfere with the local oscillation light and converts a phase difference between the signal light and the local oscillation light into an intensity signal. If the signal light is multiplexed in polarization, the signal light and the local oscillation light are split into two kinds of mutually orthogonal polarization light beams before being inputted into the optical hybrid mixer. The optical hybrid mixer makes the signal light interfere with the local oscillation light with respect to each polarization and converts the phase difference between the signal light and the local oscillation light into the intensity signal. Accordingly, it is necessary for the signal light and the local oscillation light to propagate with each polarization state conserved and maintain the coherence in the optical waveguide within the optical hybrid mixer element.

However, the optical confinement to the optical waveguide has strengthened due to, for example, adopting silicon optical waveguides in order to miniaturize the optical hybrid mixer element. Therefore, the optical propagating mode is seriously affected by the shape of a core. That is to say, the asymmetry of the shape of the core, the asymmetry of the refractive-index distribution in section, and the like make it easier that the polarization state of the light propagating through the optical waveguide varies. As a result, there is the problem that it becomes difficult for the light to propagate through the inside of the optical hybrid mixer element with the polarization state conserved if the optical hybrid mixer element is miniaturized.

On the other hand, the signal light and the local oscillation light, that is, two kinds of light beams inputted into the optical hybrid mixer element, are split in polarization, and then reach the optical hybrid mixer through the predetermined propagation paths (optical waveguides). Here, this propagation path is determined by factors such as means for realizing a polarization splitting function, a method for inputting light, and a photoelectric conversion method performed after being converted into intensity signals. At this time, the configuration of an optical circuit is complicated if attempting to integrate a plurality of optical functions or use a chip area effectively. For example, the optical circuit can be configured in which the propagation path of the signal light differs widely from that of the local oscillation light. In this case, since the variation in the polarization state during propagation also differs between the signal light and the local oscillation light, the polarization state of the signal light becomes different from that of the local oscillation light when inputted into the optical hybrid mixer. Therefore, the problem arises that it becomes difficult to convert optical signals into proper intensity signals because the coherence between the signal light and the local oscillation light in the optical hybrid mixer is impaired.

Thus, there has been the problem that the coherence of the light propagating through each optical waveguide decreases if an optical waveguide element including a plurality of optical waveguides is miniaturized and highly integrated.

An exemplary advantage according to the invention is that the coherence of the light propagating through each optical waveguide can be maintained even though an optical waveguide element including a plurality of optical waveguides is miniaturized and highly integrated, according to an optical waveguide element, an optical waveguide device, and a method for arranging an optical waveguide of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An optical waveguide element, comprising:
   a first optical waveguide configured by combining a plurality of first element waveguides; and
   a second optical waveguide configured by combining a plurality of second element waveguides without including the plurality of first element waveguides,
   wherein:
      each of the plurality of second element waveguides has a same structure as each of the plurality of first element waveguides, and
      a combination manner of the plurality of first element waveguides differs from a combination manner of the plurality of second element waveguides.

2. The optical waveguide element according to claim 1, wherein the first optical waveguide and the second optical waveguide have a same variation of a polarization state of the traveling light with regard to entire length of the first optical waveguide and the second optical waveguide.

3. The optical waveguide element according to claim 2, wherein
each of the first optical waveguide and the second optical waveguide is an optical waveguide connecting a polarization splitting unit to an optical mixing unit,
the polarization splitting unit splitting an incident light beam into mutually orthogonal polarization light beams,
the optical mixing unit mixing first propagation light having propagated through the first optical waveguide and second propagation light having propagated through the second optical waveguide.

4. The optical waveguide element according to claim 2, wherein each of the first element waveguide and the second element waveguide is at least one of a linear waveguide or a curved waveguide.

5. The optical waveguide element according to claim 4, wherein the curved waveguide includes at least one of a 90-degree curved waveguide or a 45-degree curved waveguide.

6. The optical waveguide element according to claim 1, wherein
each of the first optical waveguide and the second optical waveguide is an optical waveguide connecting a polarization splitting unit to an optical mixing unit,
the polarization splitting unit splitting an incident light beam into mutually orthogonal polarization light beams, and
the optical mixing unit mixing first propagation light having propagated through the first optical waveguide and second propagation light having propagated through the second optical waveguide.

7. The optical waveguide element according to claim 6, wherein each of the first element waveguide and the second element waveguide is at least one of a linear waveguide or a curved waveguide.

8. The optical waveguide element according to claim 7, wherein the curved waveguide includes at least one of a 90-degree curved waveguide or a 45-degree curved waveguide.

9. The optical waveguide element according to claim 1, wherein each of the first element waveguide and the second element waveguide is at least one of a linear waveguide or a curved waveguide.

10. The optical waveguide element according to claim 9, wherein the curved waveguide includes at least one of a 90-degree curved waveguide or a 45-degree curved waveguide.

11. The optical waveguide element according to claim 1, wherein the first optical waveguide and the second optical waveguide are configured to consist primarily of a silicon material.

12. The optical waveguide element according to claim 1, wherein the first optical waveguide and the second optical waveguide have a same variation of a polarization state of the traveling light with regard to entire length of the first optical waveguide and the second optical waveguide.

13. The optical waveguide element according to claim 1, wherein
each of the first optical waveguide and the second optical waveguide is an optical waveguide connecting a polarization splitting unit to an optical mixing unit,
the polarization splitting unit splitting an incident light beam into mutually orthogonal polarization light beams,
the optical mixing unit mixing first propagation light having propagated through the first optical waveguide and second propagation light having propagated through the second optical waveguide.

14. The optical waveguide element according to claim 1, wherein each of the first element waveguides and the second element waveguides is one of a linear waveguide and a curved waveguide.

15. The optical waveguide element according to claim 14, wherein the curved waveguide includes at least one of a 90-degree curved waveguide or a 45-degree curved waveguide.

16. The optical waveguide element according to claim 1, wherein the first optical waveguide and the second optical waveguide are configured to consist primarily of a silicon material.

17. An optical waveguide device, comprising:
an optical waveguide element including:
a first optical waveguide configured by combining a plurality of first element waveguides; and
a second optical waveguide configured by combining a plurality of second element waveguides without including the plurality of first element waveguides, wherein:
each of the plurality of second element waveguides has a same structure as each of the plurality of first element waveguides, and
a combination manner of the plurality of first element waveguides differs from a combination manner of the plurality of second element waveguides; and
an optical mixing unit mixing first propagation light having propagated through the first optical waveguide and second propagation light having propagated through the second optical waveguide.

18. The optical waveguide device according to claim 17, further comprising
a polarization splitting unit splitting an incident light beam inputted into the first optical waveguide and the second optical waveguide into mutually orthogonal polarization light beams at the end opposite to an end to which the optical mixing unit is connected, of the first optical waveguide and the second optical waveguide.

19. A method for arranging an optical waveguide, comprising:
preparing a plurality of element waveguide structures representing structures of a plurality of element waveguides composing an optical waveguide;
determining an arrangement of a first optical waveguide by combining two or more of the plurality of element waveguide structures; and
determining an arrangement of a second optical waveguide by combining two or more of the plurality of element waveguide structures that are not included in the first optical waveguide.

* * * * *